Oct. 13, 1964   M. M. YOUNG   3,152,749
CONTAINER BODY
Filed Sept. 18, 1962   2 Sheets-Sheet 1
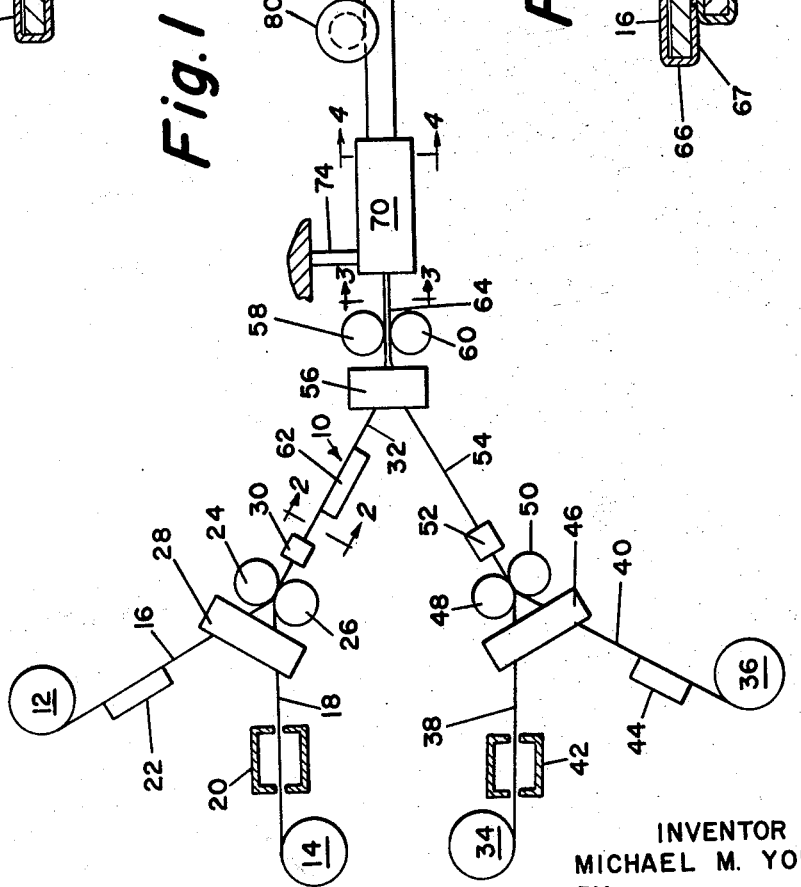
INVENTOR
MICHAEL M. YOUNG
BY
Arthur H Seidel
ATTORNEY Oct. 13, 1964   M. M. YOUNG   3,152,749
CONTAINER BODY
Filed Sept. 18, 1962   2 Sheets-Sheet 2
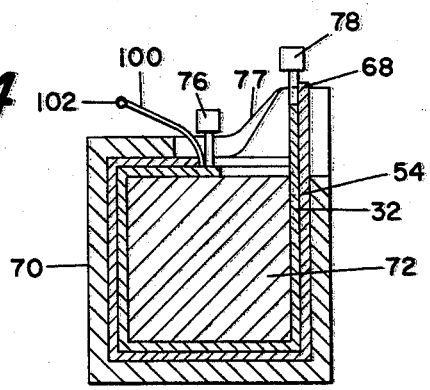
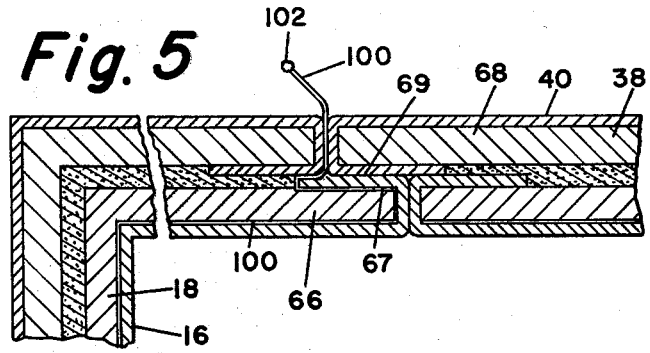
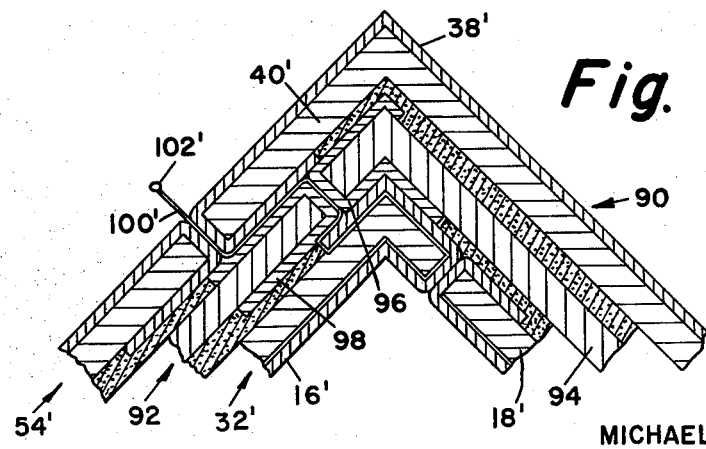
INVENTOR.
MICHAEL M. YOUNG
BY
Arthur H. Seidel
ATTORNEY United States Patent Office 3,152,749
Patented Oct. 13, 1964

3,152,749
CONTAINER BODY
Michael M. Young, Merion, Pa. (% Dietz Machine Works Inc., 20 W. Berkley St., Philadelphia 44, Pa.), assignor of fifty percent to Reginald Couzens, Wallingford, Pa.
Filed Sept. 18, 1962, Ser. No. 224,492
7 Claims. (Cl. 229—51)

This invention relates to a container body having a plurality of discrete sides, and a method and apparatus for making the same.

This application is a continuation-in-part of my copending application Serial No. 201,158 entitled Container Body and Method of Making Same filed on June 8, 1962, now Patent No. 3,122,305. In the above mentioned copending application, the container body is cylindrical in cross section. The present invention is directed to container bodies and the apparatus and method for making the same wherein the container bodies have at least three discrete sides. Preferably, the container bodies of the present invention have four discrete sides and will therefore be of the conventional type utilized for food products.

The present invention is directed to a container body in tubular form and a continuous apparatus and method for manufacturing the same. Heretofore, container bodies having three or more discrete sides were not continuously manufactured. Instead, an apparatus in the nature of a press was utilized to stamp-out a blank for a container body. Thereafter, the blanks were fed to a folding apparatus which assembled the same into a container body with a lap-type joint being provided at the junction of the longitudinally extending edge portions of the blank.

Recently, there has evolved in industry a great need for container bodies made from laminates of paper and other materials which can be rapidly manufactured and are capable of containing liquids, solids, and semi-solids. As a general rule, the innermost layer of the container body must be waterproof in nature since it will be in direct contact with the material disposed therewithin. As a general rule, the outermost layer must be waterproof in nature as necessitated by a desire to prevent destruction of the container body when the same is subjected to liquids such as floods, rain water, steam, liquid condensates, etc. as a result of the transportation, storage or handling of the same. The apparatus and method utilized heretofore for making multi-sided containers wherein a blank is preformed and then assembled requires a two-step operation generally performed by two different entities. Further, the stamping press and folding apparatus are complicated expensive pieces of equipment. The present invention facilitates the continuous manufacture of container bodies on a single piece of equipment which is simpler than either of the pieces of equipment utilized heretofore.

The container body made in accordance with the present invention has a plurality of discrete sides and in cross section may be a triangle, rectangle, square, pentagon, hexagon, etc. The container body is preferably made from a paper-like material having at least two discrete layers bonded to one another. Where great strength is not required, two layers of paper impregnated with a waterproof material may be utilized. Where strength is desired, the two waterproof layers may be in the nature of layers of nylon, Mylar, polyethylene, aluminum foil, etc. with layers of substrate reinforcement material disposed therebetween and bonded thereto. In many circumstances where it is desirable to store chemicals or oils within the container body, it is preferable to have at least the innermost layer made from aluminum foil or the like.

In accordance with the method of the present invention, an endless strip of laminated material is continuously shaped about a mandrel having at least three discrete sides, adhesive is applied to free edges of the strip, and then the free edges are joined together with a rabbeted joint extending longitudinally of the endless tubular form. Thereafter, the endless tubular form is cut into unit lengths. In order to form a container, end caps or the like may be applied to the free ends of the unit lengths in accordance with known methods.

It is an object of the present invention to provide a novel container body having at least three discrete sides.

It is another object of the present invention to provide a container body made from a laminated material and capable of being continuously manufactured at rapid speeds.

It is another object of the present invention to provide a container body having at least four discrete sides with a waterproof layer on its inner and outermost surfaces with a rabbeted joint extending longitudinally of the container body so that the container body is of uniform thickness.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a diagrammatic illustration of the apparatus utilized in constructing container bodies in accordance with the present invention.

FIGURE 2 is a sectional view taken along the lines 2—2 in FIGURE 1.

FIGURE 3 is a sectional view taken along the lines 3—3 in FIGURE 1.

FIGURE 4 is a sectional view taken along the lines 4—4 in FIGURE 1.

FIGURE 5 is a sectional view taken along the lines 5—5 in FIGURE 1.

FIGURE 6 is a sectional view of a laminated strip in accordance with another embodiment of the present invention.

Referring to the drawing in detail, wherein like numerals indicate like elements, there is shown in FIGURE 1 a diagrammatically illustrated tube making machine designated generally as 10. The machine 10 includes unwind rolls 12 and 14 rotatably supported for rotation about their longitudinal axes. Roll 12 contains a strip of a waterproof material such as aluminum foil. Roll 14 contains a strip of a substrate such as paper. The width of strip 16 is greater than the width of strip 18. The thickness of strip 16 may be approximately 0.001 to 0.002. The thickness of layer 18 will generally be several times greater than the thickness of layer 16.

The description hereinafter will refer to strip 18 as being a strip of paper. It is to be understood that the term "paper" is being used in a general sense and therefore includes cardboard, chipboard, etc. As a strip 18 is unwound from roll 14, it is preferably fed through a heater 20 to remove moisture from the strip 18. Unless a substantial amount of or all moisture is removed from the strip 18, the same will be permanently trapped within the container body and may be a source of trouble in a finished product. The surface of strip 16 juxtaposed to the strip 18 is provided with a layer of adhesive by means of adhesive applicator 22.

The strips 16 and 18 are fed between pressure rollers 24 and 26. The strips 16 and 18 are fed through a dispenser guide means 28 which intermittently adhesively secures tear string 100 to strip 18 at spaced points therealong. Means 20 also assures that the strips 16 and 18 are properly orientated with respect to each other when passing between rollers 24 and 26.

After passing through the rollers 24 and 26, the adhesively secured laminate is fed through a folder 30 which causes the side edge portions of the strip 16 to overlap string 100 and side edge portions of the strip 18 thereby forming a laminate 32 as illustrated more clearly in FIGURE 2. At this point, I would like to note that the laminate 32 could alternatively be made by passing a substrate such as strip 18 through an evacuated chamber wherein it may be coated with a metal film such as a film of aluminum or the strip 18 could be impregnated with a waterproof wax or plastic resin. The above described apparatus and method for forming the laminate 32 is preferred since the same is cheaper and more acceptable to the trade.

The apparatus 10 also includes rolls 34 and 36 which are adapted to rotate about their longitudinal axes. Roll 36 contains a strip 40 of waterproof material similar to strip 16. Preferably the unexposed surface of strip 40 when it is on roll 36 is provided with spaced labels printed thereon. The labels printed on strip 40 are a series of spaced labels with a mark between labels along which the tubular form will be cut so as to provide container bodies of unit length.

Roller 34 contains a strip 38 of substrate material such as the substrate material of strip 18. The strip 38 is preferably fed through a heater 42 as it is unwound from roll 34 so that moisture will be removed therefrom. A coating of adhesive is applied to the surface of strip 38 juxtaposed to strip 40 by means of adhesive applicator 44. The strips 38 and 40 are guided by guide means 46 so that they are properly orientated with respect to each other. Thereafter, the strips are fed between pressure rollers 48 and 50. The laminate of strips 38 and 40 after passing between rollers 48 and 50 is fed through a folder 52 which is comparable to folder 30. The laminate formed from strips 38 and 40 is designated as 54. Laminate 54 is identical in cross section with laminate 32 as illustrated in FIGURE 2, but is wider since it will surround laminate 32 and does not have a tear string.

A film of adhesive is applied to the lowermost surface of laminate 32 by means of adhesive applicator 62. Thereafter, the laminates 32 and 54 are fed through a guide means 56 which properly orientates the laminates with respect to each other.

The properly orientated laminates 32 and 54 are then fed between pressure rollers 58 and 60. The laminated structure formed from the laminates 32 and 54 as it emerges from rollers 58 and 60 is designated as 64. As shown more clearly in FIGURE 3, the laminates 32 and 54 were orientated with respect to each other by guide means 56 so that side edges of the laminates were transversely spaced from each other as the laminates were passed between the rollers 58 and 60. Thus, the laminated structure 64 is provided with a longitudinally extending tab portion 66 on one side thereof thereby forming a shoulder 67 on a lowermost surface thereof. Also, the laminated structure 64 is provided with a longitudinally extending tab portion 68 on the other side thereof thereby forming a longitudinally extending shoulder 69 on an upper surface thereof.

The thusly formed laminated structure 64 is then fed through a folder 70 which transforms the planar laminated structure 64 into a tubular shape having at least three discrete sides and preferably four sides. This is accomplished by causing the laminated structure 64 to be fed between a shaping wall of the folder 70 and a stationary rectangular mandrel 72. If a five sided container is desired, the mandrel 72 would be provided with the desired cross section. One end of the mandrel 72 is supported by bracket supports 74.

As shown more clearly in FIGURE 4, the laminated structure 64 is caused to be wrapped around the mandrel 72 in a manner so that an adhesive may be applied to shoulder 67 by applicator 76 and adhesive applied to the end surfaces of portion 68 by applicator 78. Subsequent to the illustration of the relationship between the portions 66 and 68 as illustrated in FIGURE 4, the curved wall 77 of folder 70 will cause the shoulder 69 to be juxtaposed to the shoulder 67 thereby forming a rabbeted joint. By having a rabbeted joint extending longitudinally of the tubular shape, the tubular shape will have a uniform wall thickness.

After emerging from the folder 70, the rabbeted joint will be caused to pass beneath a rotatably supported pressure applicator 80 having its pressure applying surface juxtaposed to the rabbeted joint. Drive rollers 81 and 81' may be provided to positively drive the tubular shape along the mandrel 72. As the tubular shape moves along the mandrel 72, marks provided between printed labels on the strip 40 will be detected by the electric eye 82. The electric eye 82 is structurally interrelated with an orbital cutter 84.

The details of electric eye 82 form no part of the present invention since the same is commercially available. It is not deemed necessary to describe the operation of the orbital cutter 84 in detail since the same is well known to those skilled in the art and is generally referred to as a "flying cutter." Means, not shown, are provided to cause the cutter 84 to reciprocate on a carriage at the same speed as the tubular shape. When a mark on the label is detected by the electric eye 82, a similar mark will then be opposite the knife of the cutter 84. Such detection by the electric eye 82 triggers the knife which severs the tubular shape into unit lengths. It will be obvious to those skilled in the art that the cutter 84 may have one or more cutting knives so that one or more unit lengths may be cut from the tubular shape at the same time.

For purposes of illustration, it will be assumed that container body 86 is one of the unit lengths cut from the endless tubular shape by cutter 84. As shown more clearly in FIGURE 5, the laminated structure 64 has been converted into a rectangular container body with the longitudinally extending edge portions of the laminate structure 64 joined together with a rabbeted joint. In this regard, it will be noted that the longitudinally extending edge portions of the inner and outermost layers are joined together with a butt-joint. It will be noted that the illustration in FIGURE 5 is on a greatly enlarged scale. Thus, it will be seen that the container body of the present invention includes inner and outer waterproof layers secured together thereby providing a waterproof container body material while at the same time having a uniform wall thickness and capable of being continuously manufactured at rapid production rates.

The laminated structure 64 described above and illustrated in FIGURE 3 is composed of two laminates. To provide stronger container bodies, such as container bodies for one gallon oil cans or one gallon milk containers, a laminated structure designated generally as 90 may be utilized. As shown more clearly in FIGURE 6, laminated structure 90 is composed of three laminates. However, additional laminates may be provided as desired.

Laminated structure 90 is composed of laminates 32', 54' and 92. Laminates 32' and 54' are identical with laminates 32 and 54, respectively. It will be noted that the laminates of laminated structure 90 are bonded together in a staggered pattern so that a longitudinally extending tab portion is provided on the side edge portions thereof, thereby facilitating the provision of a rabbeted joint when the laminated structure 90 is formed into a tubular shape in the manner described above. The rabbeted joint in FIGURE 6 is positioned at a corner of the tubular shape for increased strength.

The laminate 92 is composed of a substrate 94 which is similar to the substrates 18 and 38. The substrate 94 may be of greater thickness than the substrates 18 and 38. The laminate 92 differs from the laminates 32' and 54' in that a waterproof layer need not be provided across the full width thereof. Hence, the substrate 94 is provided with a strip of waterproof material 96 which merely overlaps and is bonded to one longitudinally extending edge portion of the substrate 94. A strip of waterproof material 98 overlaps and is bonded to the other longitudinally extending edge portion of the substrate 94. The strips 96 and 98 may be made from the same material as the strips 16′ and 38′, which in turn are identical with strips 16 and 38.

The laminated structure 90 may be continuously made into an endless tubular shape on machine 10 in the same manner described above. In this regard, it is not deemed necessary to repeat the above description. Thus, it will be seen that the method of making the container body of the present invention enables container bodies to be made at a faster rate and with greatly simplified apparatus as compared with the commercial apparatus proposed heretofore. The apparatus of the present invention is designed to operate continuously, that is twenty-four hours a day. It will be appreciated that the illustration is purely diagrammatical for the purposes of illustration. Hence, electrical circuitry, motors, detective switches for stopping the machine when the rolls 12, 14, 34 and 36 are emptied, etc. are not illustrated since the same are conventional in the art.

The tear strings 100 and 100′ terminate in a tab 102 and 102′, respectively. The strings are preferably narrow flat ribbons of nylon. The strings are positioned so that they extend around the container body at a point adjacent one end thereof just below a flange on an end cap which will be applied to body 86. When it is desired to open a sealed container, tab 102 is grasped and pulled thereby severing layers 18, 38 and 40. Thereafter, pulling or twisting the end cap readily severs the layer 16. It will be appreciated that a tear string is not required when the container body is intended to be utilized in a manner not conducive to use of the same. For example, a tear string would not be utilized if body 86 were to be used as a paint can since access into the body will be accomplished through one of the end caps.

The present invention may be embodied in other specific forms without departing from the spirit or essential attributes thereof and, accordingly, reference should be made to the appended claims, rather than to the foregoing specification as indicating the scope of the invention.

I claim:

1. An article of manufacture comprising a hollow tubular laminated body having at least three discrete sides, the inner and outer layers of said body being waterproof, radially outwardly extending edge portions of said inner layer being joined together with a first butt-joint extending in an axial direction, radially inwardly extending free edge portions of said outer layer being joined together with a second butt-joint extending in an axial direction, said first and second butt-joints being circumferentially spaced with respect to the longitudinal axis of said body, and reinforcement substrate material between and bonded to said layers.

2. An article in accordance with claim 1 wherein said inner and outer layers are aluminum foil.

3. An article in accordance with claim 1 including a tear string between said layers, said string extending in a circumferential direction.

4. An article in accordance with claim 1 including a tear string member secured between said layers, a portion of said string member extending across said first and second butt joints.

5. An article of manufacture comprising a hollow tubular laminated body, said body having at least three discrete sides, said body including inner and outer layers of waterproof material, said body including first and second reinforcement layers of substrate material, said first and second layers being between and bonded to said inner and outer layers, longitudinally extending side edge portions of said inner layer overlapping the longitudinally extending side edges of said first layer, longitudinally extending side edge portions of said outer layer overlapping longitudinally extending side edges of said second layer, said longitudinally extending edge portions of said inner layer being joined together with a first butt-joint extending in a direction substantially parallel to the longitudinal axis of said body, said longitudinally extending edge portions of said outer layer being joined together with a second butt-joint extending in a direction substantially parallel to the longitudinal axis of said body, said first and second butt-joints being circumferentially spaced with respect to the longitudinal axis of said body.

6. An article of manufacture in accordance with claim 5 including a tear string member secured between said inner layer and said first layer, a portion of said string member extending across said first and second butt-joints, said string member being circumferentially disposed with respect to said body adjacent one end of said body, said substrate material being paper-like material.

7. An article of manufacture in accordance with claim 5 wherein said longitudinally extending side edge portions of said outer layer extend over said longitudinally extending side edges of said second layer between juxtaposed faces of said first and second layers, said longitudinally extending side edge portions of said inner layer extending over said longitudinally extending side edges of said first layer between juxtaposed surfaces of said first and second layer.

References Cited in the file of this patent

UNITED STATES PATENTS

| | | |
|---|---|---|
| 1,944,970 | Dieffenbach | Jan. 30, 1934 |
| 2,828,239 | Fischer | Mar. 25, 1958 |
| 2,848,151 | O'Neil | Aug. 19, 1958 |
| 3,030,001 | Stump | Apr. 17, 1962 |
| 3,066,721 | Levy | Dec. 4, 1962 |
| 3,070,274 | Elam | Dec. 25, 1962 |
| 3,079,059 | Kuchenbecker | Feb. 26, 1963 |